(12) United States Patent
Khashaei

(10) Patent No.: US 7,757,406 B2
(45) Date of Patent: Jul. 20, 2010

(54) VEHICLE TRAVEL GRADE INDICATOR (VTGI)

(76) Inventor: Sepehr Khashaei, 1121 4$^{th}$ Ave. East, West Fargo, ND (US) 58078

( * ) Notice: Subject to any disclaimer, the term of this patent is extended or adjusted under 35 U.S.C. 154(b) by 0 days.

(21) Appl. No.: 11/807,364

(22) Filed: May 29, 2007

(65) Prior Publication Data

US 2008/0295350 A1    Dec. 4, 2008

(51) Int. Cl.
*E01C 23/01* (2006.01)
(52) U.S. Cl. .............. 33/521; 33/534; 33/600
(58) Field of Classification Search ............. 33/1 PT, 33/288, 521, 534, 535, 536, 537, 600
See application file for complete search history.

(56) References Cited

U.S. PATENT DOCUMENTS

| | | | | |
|---|---|---|---|---|
| 3,564,531 A | * | 2/1971 | Burgin | 172/4.5 |
| 3,900,073 A | * | 8/1975 | Crum | 172/430 |
| 5,187,977 A | * | 2/1993 | Koschorek et al. | 33/521 |
| 5,351,540 A | * | 10/1994 | Gee | 73/146 |
| 5,450,909 A | * | 9/1995 | Stevenson | 33/288 |
| 5,596,826 A | * | 1/1997 | Barden | 33/333 |
| 5,797,109 A | * | 8/1998 | Aminpour et al. | 701/65 |
| 7,400,946 B2 | * | 7/2008 | Lee et al. | 701/1 |

* cited by examiner

*Primary Examiner*—G. Bradley Bennett

(57) ABSTRACT

A method and device for determining the grade/slope of the road upon which a vehicle is traveling and displaying said grade/slope through a visual display that is adjustable by the driver/operator of said vehicle to his/her convenient sight of vision; wherein such device can also be used by many industries, machineries, and engineering fields of many types; wherein such device does so by its internal parts which include shafts, gears, bushes, weights, a spring, brake shoes, cylinders, and other, all within a shell, with (or in some cases without) oil; wherein positive or negative accelerations will not affect the performance of said device. Said device is fixed in the said vehicle by either said operator or the manufacturer of said vehicle and said device will measure said grade/slope independent of any driving members or parts of said vehicle or other devices, power, sensors of any kind, and/or anything else outside of its shell.

12 Claims, 2 Drawing Sheets

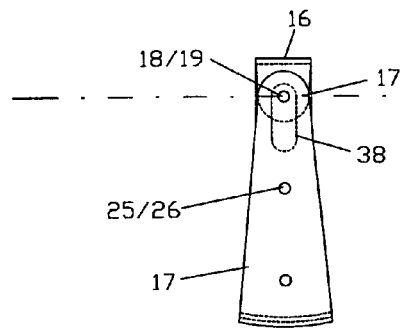
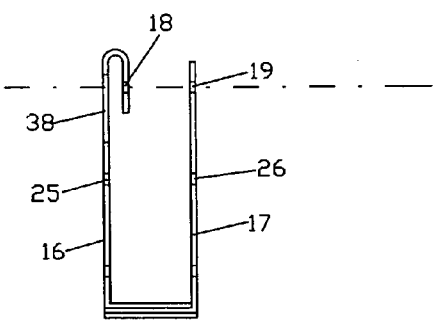
FIG 4
FIG 5
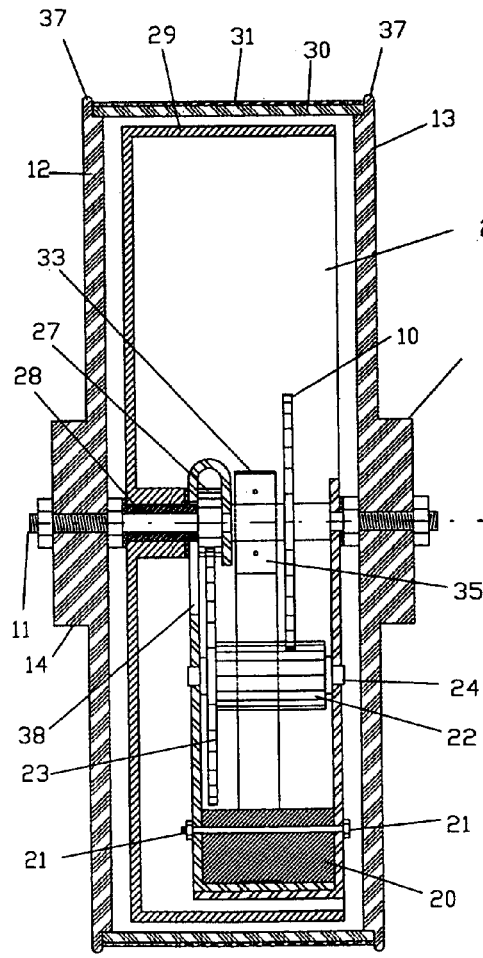
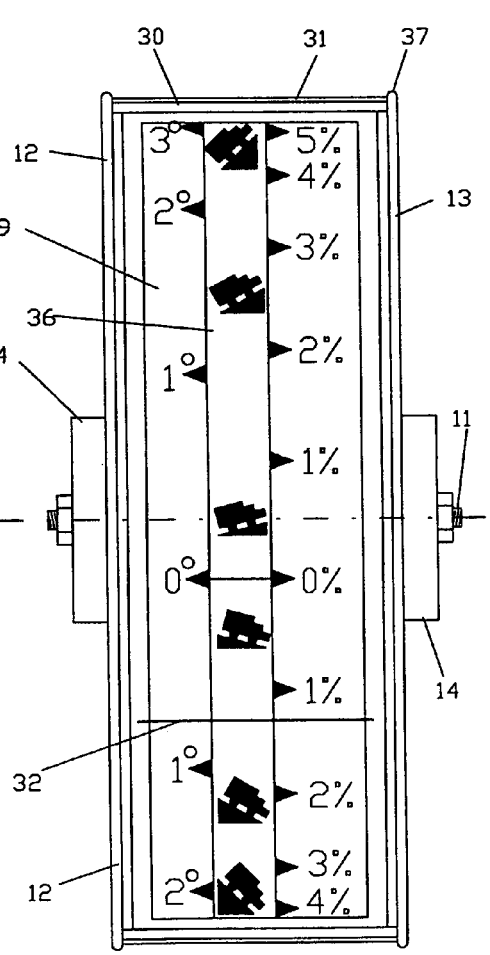
FIG 6
FIG 7

VEHICLE TRAVEL GRADE INDICATOR (VTGI)

REFERENCES

U.S. Patent Documents 3,846,781 November 1974 Smith
3,900,073 August 1975 Crum
4,583,296 April 1986 Dell' Acqua
5,132,906 July 1992 Sol, et al.
5,187,977 February 1993 Koschorek, et al.
5,351,540 October 1994 Gee
5,446,658 August 1995 Pastor, et al.
5,450,909 September 1995 Stevenson
5,596,826 January 1997 Barden
7,400,946 July 2008 Lee, et al.
5,797,109 August 1998 Aminpour, et al.

BACKGROUND OF THE INVENTION

1. Field of the Invention

The present invention generally related to a method and device for independently, when such device is installed and adjusted properly, measuring and displaying the slope/grade of a road/terrain in many kinds of moving or stationary and motorized or non-motorized vehicles.

2. Description of Prior Art

Vehicle Travel Grade Indicator (VTGI) is a device designed to show the slope/grade of a road/terrain through a visible display to the driver of the vehicle who is driving on that road/terrain. It does so by complex relationships between its internal parts (i.e. shafts, gears, bush, weight, spring, and other) and substance (i.e. oil), which are later explained in detail in the "Detailed Description of the Invention" section.

So far lots of efforts have been engaged to make ways to help the transportation industries make the vehicles safer, more effective, more controllable, more comfortable, and more economical when dealing with different environmental conditions. As part of this effort, prior inventors may have tried to come up with a device that would show the slope/grade of a road on which a driver may be driving on, but to my best knowledge none have been able to come up with a device that would practically and effectively do so "independently" and on most kind of vehicles. As one can see, at present time there is no such device installed on any vehicle that generally we know of that would be in continuous use, even though the use of such device in vehicles is very crucial and vital, as described below.

Why is it crucial and vital to have a device that shows the slope/grade of the road/terrain to the driver of the vehicle on that road/terrain? Many of us have traveled or driven on interstate freeways, highways, or other roads during the winter and have been either involved ourselves or seen other vehicles slide out of roads or involved in accidents because of braking on slippery roads. Some of these events occur only because the driver was not aware of the real slope of the road on which he/she was driving. Also, imagine when bad or harsh road or environmental conditions, such as black ice, fog, heavy snow, heavy rain, heavy winds, narrow curvy roads, etc, and night driving on a hilly up and down road/terrain, make it difficult for a truck or bus driver to recognize the grade/slope of the road that he/she is driving on (due to sight/visual human error). One can therefore imagine how many trailers, trucks, buses, cars, and other type of vehicles have been involved in slippery accidents (especially during the winter months), and therefore how many precious lives and loads have been lost per year all over the world due to these type of accidents. With the knowledge of the slope/grade of the road, the driver is in better control of the safety of his/her passengers and/or loads especially during the required shifting and braking. VTGI is designed for this purpose. As one can see, a slope indicator should be an integral part of any vehicle, just like a speedometer and an odometer are.

In order to invent a device that would accurately indicate or measure the slope/grade of a course that a vehicle is traveling on, one should consider several important things:

1) The varying angle between the natural constant vertical gravity force axis and the oscillating vertical axis of the vehicle, caused by traveling up and down mountainous/hilly roads.
2) The ability to convert and show small changes in the slope/grade as a larger scale on the display of the slope/grade indicator to the operator.
3) Deviation of plummet due to change in speed (+/− accelerations) caused by pushing on the brake or gas pedals of the vehicle by the driver/operator when driving on a road/terrain (My primary hand made prototype showed that the deviation movements from the slightest push on the brake pedal by the driver created at least 6 degrees of angular deviation by the plumb from the natural constant vertical axis. When a driver presses the brake pedal hard enough, this deviation could go up to 60 degrees or more. Knowing that the grade on the U.S. freeways and most of the highways generally does not exceed 6% (which is equivalent to 3.43 degrees), one can see why overcoming this obstacle, when coming up with an invention and design for a slope/grade indicator for vehicles, is both important and hard).

Furthermore, it is desirable if such device is:
1) Made in various price range for various users
2) Able to be made in many different reading scales
3) Flexible in installation in most vehicles
4) Able to be made both as a portable device and as a device that is installed by the manufacturer in to the vehicle
5) Easy to be calibrated by the driver
6) Independent of anything outside of its surrounded shell
7) Not requiring any source of external or internal power supply
8) Able to be made in different sizes and/or weights
9) Able to be manufactured from many different types of materials
10) Within easy reach and is easily visible to the operator of the vehicle
11) easily adjusted to the sight of the driver within seconds
12) Able to be manufactured in variety of different desired scales of reading for different fields of use
13) Able to be made to be used in most kind of motorized or non-motorized vehicles, commercial or private vehicles, regardless of the size and application of the vehicle, and on motorcycles, bicycles, and even toys
14) Accurate in showing the slope/grade and not just an estimate of such
15) Reliable
16) Able to be made so that it is not affected by external factors such as dust, bad weather, rain, snow, etc.
17) Able to measure the slope/grade quickly and continuously.

By its intricate design, VTGI would overcome all the above obstacles. This is explained in more detail in the "Detailed Description of the Invention" section.

Here is a discussion of prior U.S. patents related to this specific method and device which make them different:

1) U.S. Pat. Nos. 3,846,781(Smith), 3,900,073(Crum), and 5,450,909 (Stevenson) are only for earthmoving/earth working equipment.
2) U.S. Pat. No. 4,583,296 (Dell'Acqua) relies on electrically-conductive liquid/material and electrodes and measurement of electrical resistance.
3) U.S. Pat. No. 5,132,906 (Sol, et al.) "estimates" the hill slope and relies on vehicle and engine measurements.
4) U.S. Pat. No. 5,187,977 (Koschorek, et al.) is for recognition of a rising slope and not the measurement of such slope. Also, it relies on at least one sensor in relationship to the axle load of the rear axle or the front axle of the vehicle with electronic component.
5) U.S. Pat. No. 5,351,540 (Gee) relies on two different sensors for generating two different signals and a grade angle generator to come up with the grade angle.
6) U.S. Pat. No. 5,446,658 (Pastor, et al.) "estimates" incline angle of a road for a "front wheel drive" vehicle and relies on a rotational speed sensor on each non-driven rear wheel, and on longitudinal and lateral accelerometers mounted to the vehicle chassis above the centerline of the rear axle.
7) U.S. Pat. No. 5,596,826 (Barden) is a level indicating mechanism for a "work machine".
8) U.S. Pat. No. 7,400,946 (Lee, et al.) is a method and apparatus for measuring the velocity of a vehicle.
9) U.S. Pat. No. 5,797,109 (Aminpour, et al.) is a method and relies on information related to driven axles (rolling free of slip) and the non-driven axles of the vehicle.

Methods and devices of prior art therefore have shown to have one of the following drawbacks: the limit of their accuracy, dependency (i.e. on sensors, axles or other moving part of the vehicle, and/or electronic power), limited application (i.e. earthmoving equipment), or specific type of vehicles (i.e. front wheel drive).

BRIEF SUMMARY OF THE INVENTION

The present invention provides a method and device which is used to measure the longitudinal slope of any road/terrain that any vehicle may be traveling on and provides that information to the driver/operator of said vehicle through a visual display that is within his/her sight and reach. This device is made in such a way that it is independent of any external factors or moving parts or sensors or power source. It can be made in many different sizes and weights and it can be easily installed after or during manufacturing of said vehicle. It functions in all weather conditions. It takes all the +/− accelerations of said vehicle and all movements of its plummet (including all the unnecessary loose movements) in to account and provides the said information in an accurate, reliable, and quick way. It is easily calibrated and can be easily used by any driver regardless of education level or background. It can be mounted in many locations in almost any vehicle. It can be made from many different materials in many different prices, a wide range of sizes, and different scales for many different applications.

BRIEF DESCRIPTION OF THE DRAWINGS

In order to explain the design and function of VTGI, two pages of drawings (designated by either page 1 of 2 or page 2 of 2 on top of each page) are attached to this document. There are a total of 7 figures drawn (marked as FIG. 1 to FIG. 7 under each corresponding figure). FIGS. 1-3 are on page 1 and FIGS. 4-7 are on page 2 of the drawings respectively. These figures will be frequently referred to later on, especially in the "Detailed Description of the Invention" section of this document. A total of 38 Arabic numbers (from 1 to 38) are used to mark different parts of VTGI in the drawings. The same Arabic numeral on one figure refers to the same part in a different view/magnification on a different figure. The function of each one of the parts of VTGI, which are numbered from 1 to 38, will be explained through the "Detailed Description of the Invention" section. Below are the descriptions of each figure in the two pages of drawings:

Page 1 of 2 contains 3 figures as follows:
FIG. 1: Side view of all the gears and shafts
FIG. 2: Front view of all the gears and shafts
FIG. 3: Enlarged and sectioned side view showing the parts assembled Page 2 of 2 contains 4 figures as follows:
FIG. 4: Side view of the bearer frames assembly
FIG. 5: Front view of the bearer frames assembly
FIG. 6: Enlarged front view sectioned from center line showing the parts assembled
FIG. 7: Front view of VTGI

DETAILED DESCRIPTION OF THE INVENTION

Figures 1, 2:
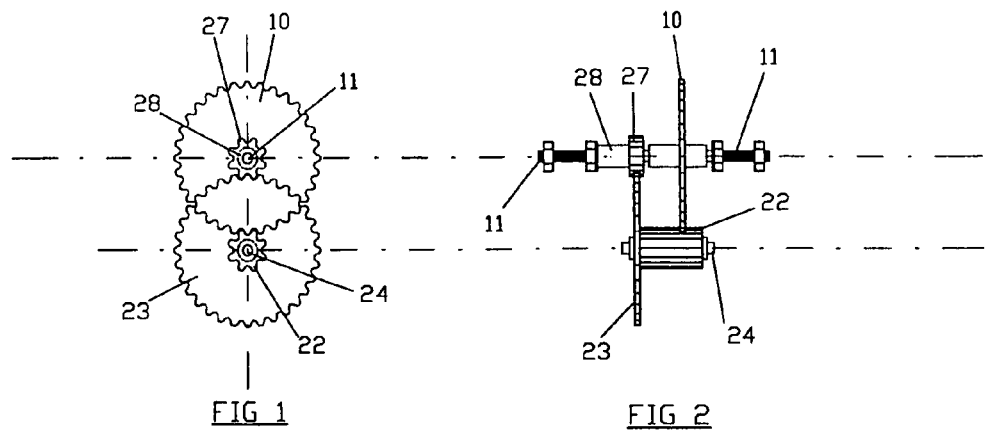
Figure 3:
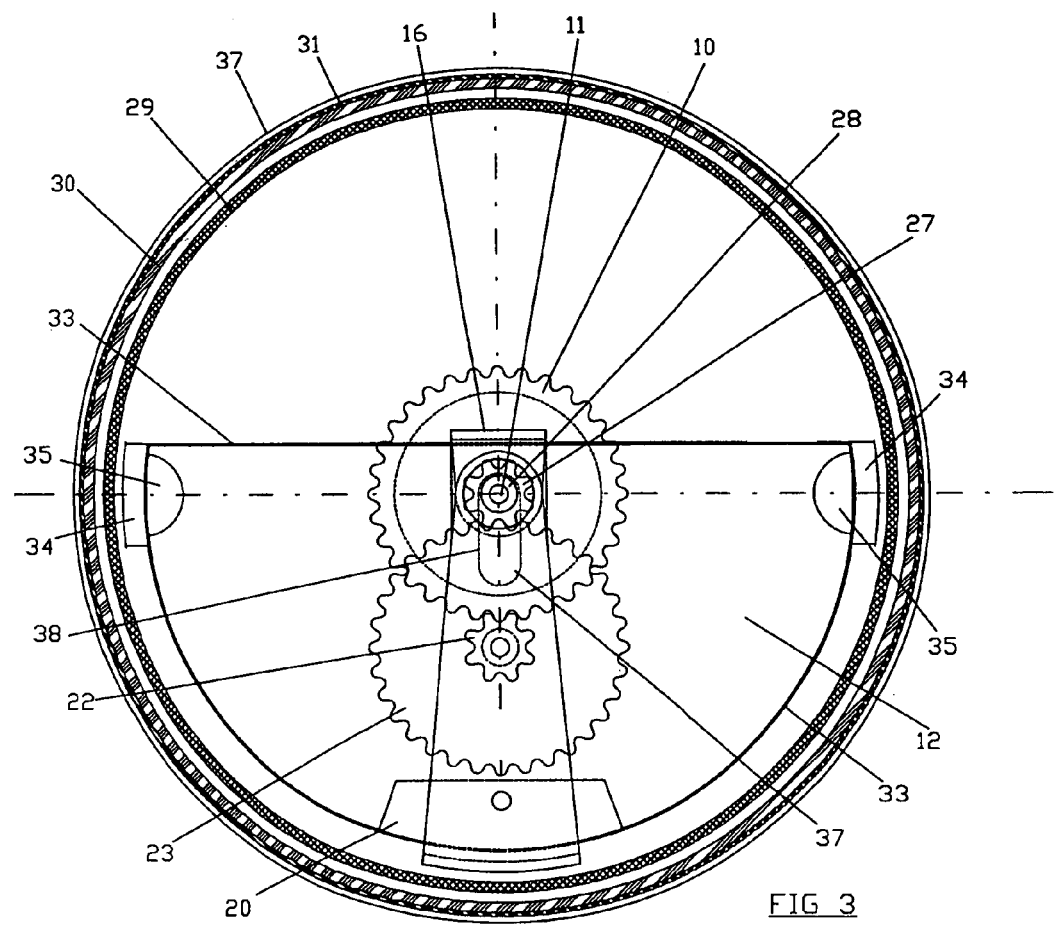

This part of this document will explain in detail different parts of VTGI and how these parts work together to make this device measure the slope/grade of the road on which a vehicle is traveling. The Arabic numbers used in this section of this document refer to the figures on the 2 sheets of attached drawings as mentioned earlier.

The see-through cylinder 30 is held and fixed in between caps (embodiments) 12 and 13. Together they make VTGI's sealed shell. The main shaft 11, with gear 10 fixed on it, is fixed at its two ends to the centers of the two round embodiments 12 and 13 of the shell of the instrument and their outside relief cylinders 14.

VTGI is fixed by its two cylinders 14 to the vehicle within the driver's convenient sight by either the manufacturers of the vehicle (in the instrument panel of the vehicle) or by the driver (on universal footings that are obtained from the VTGI manufacturers).

The installation/fixing of VTGI in the vehicle has to be done in a way that the axis of main shaft 11 is vertical to the imaginary plane made from the crossings of the lines of the longitudinal and vertical axis of the vehicle (which is generally assumed to be parallel to both the longitudinal and vertical axis of the course on which the vehicle is traveling). The front and rims of caps have to be partly exposed to the operator so that by pushing his/her thumb on the rim and turning the shell, he/she can see and/or adjust the slope/grade readings (that are being displayed on drum 29) to his/her convenient sight position. This installation/fixing has to be so tight that the shell of the instrument can be turned (to adjust to the driver's sight) only by the driver's thumb on rim 37. As a result of this, VTGI will be a fixed part of the vehicle; therefore, any slightest angular movement of the vehicle, caused by the longitudinal movement of the vehicle traveling up or down any slope, will be exactly the movement of the shell of the instrument, shaft 11, and gear 10.

Frames 16 and 17 are hung from main shaft 11 by holes 18 and 19. Gravity weight 20 is held between and on the bottom of frames 16 and 17 by bolt and nut 21. Gears 22 and 23 are fixed on shaft 24 which in turn is installed parallel to the main shaft 11 between frames 16 and 17, through the two holes 25 and 26. With the new technology, manufacturers may be able to build some or all parts of the two frames 16 and 17, bolt and nut 21, and/or gravity weight 20 as one piece, in such way that it would not interfere with the assembly and function of other VTGI parts.

A combined central gravity axis (abbreviated as CCGA) is produced from the central gravity of the collection and combination of the weights of all the parts carried on frames 16 and 17 (such as gravity weight 20, gears 22 and 23, shaft 24, spring 33, bolt 21, and the two frames 16 and 17 themselves). CCGA is parallel to main shaft 11 and works as a plummet weight hung under it.

Gear 27 and indicating drum 29 are fixed on bush 28 and altogether, as one piece, turn on shaft 11.

VTGI is made in such way that the number of teeth on gear 10 is more than the number of teeth on gear 22; therefore, any slight angular rotation of gear 10 will transfer as a larger rotation to gears 22 and 23 (both of which are fixed on shaft 24). Also VTGI is made so that the number of teeth on gear 23 is more than the number of teeth on gear 27; therefore, any angular rotation of gear 23 will transfer as a larger rotation to gear 27 and indicator drum 29 (both of which are fixed on bush 28). As the result of what was explained above, any slight angular rotation of gear 10, caused from traveling of the vehicle up or down a road/terrain, will transfer into a much larger angular rotation to indicating drum 29. The slope/grade will be shown on indicator drum 29, which is actually the display of VTGI, to the driver.

Any slight angular rotation of shaft 11 and gear 10, forces the CCGA, through gear 22, to deviate from its position, but the gravity force of CCGA would push it to get to its natural position under the axis of shaft 11 and gear 10, which causes the transfer of the force through gears 23 and 27 to roll indicating drum 29 and show the slope/grade digit of the road.

It is obvious that the sum of the radii of the two gears 10 and 22 are equal to the sum of radii of the two gears 23 and 27, and it is obvious that the scale of the digits on indicating drum 29 depends on the chosen size and number of engaged teeth of the four gears 10, 22, 23, and 27. Choosing a match of different sizes and/or different numbers of teeth of the combination of these four gears (which work as ratio gears in VTGI), can help manufacturers make different desired scales of readings for different fields of use of VTGI. This can simply be done by choosing the right proportion number of teeth in the gears. One of the positive points of VTGI is that the scale of the reading on the display can be expanded to even several complete rounds of full circular turns (360 degrees each) of the drum to match the desired scale of reading of the intended use (each turn would show an additional line on the indicating drum surface). This feature of VTGI will give the manufacturers the ability to make the VTGI in such way that it could easily show decimals of slopes/grades in scales that are hundreds of times larger.

Another see-through cylinder 31 which slides on see-through cylinder 30, has the horizontal indicating line 32 marked on it. This way, the digits marked on indicating drum 29, can be visualized and read through see-through cylinders 30 and 31, right under horizontal indicating line 32.

At any time the vehicle is standing immobile, one can see the same constant reading under horizontal line 32. This is due to the constant position between the CCGA and still position of gear 10. On the other hand, if the vehicle is traveling up or down a slope or if the driver turns the shell of VTGI with his/her thumb on rim 37, gear 10 will turn and will act on drum 29 to move it to a different digit.

VTGI gives the driver of the vehicle the ability to change the position of the readings on cylinder/drum 30 to his/her desired convenient sight. As an example, to do so, the driver sits at his/her convenient comfortable position on the driver's seat when the vehicle is standing still on a known grade/slope (such as the level ground in a gas station). Then by turning shell rim 37 slightly with his/her thumb up or down, brings the digit of the known slope of the surface that the vehicle is standing on to his/her comfortable line of vision (the digit '0' if on a level ground). The driver then brings horizontal line 32 on the chosen digit. From this point on, the driver will be able to see the digit of the grade/slope of the road/terrain that the vehicle will be driving on, on the drum display under the horizontal line. As explained earlier, any operator/driver can easily at any time adjust VTGI's position to his/her own convenient sight of reading no matter how tall or short he/she may be, or how high or low his/her seat may be, just as drivers adjust their mirrors before driving. Although this task has easily been accomplished by this inventor's hand-made prototype, the manufacturers of VTGI can make this even easier by adding teeth to rim 37 and one screw installed tangent to that. This way the driver can turn the drum slightly by turning the screw rather than using his/her thumb.

In order to explain the other intricate parts of VTGI which makes it practical, one needs to present the following short discussion:

As described before, it will take only a fast +/− acceleration (as caused by several constant seconds of fast strong push on the brake or gas pedal by the driver, in times of quickly speeding up or slowing down) to cause CCGA to go out of its constant position from under shaft 11. This will cause many degrees of waste movements of CCGA and a large deviation in drum 29 (display) rotation. Furthermore, it will take several oscillations for CCGA (which works as a plummet under shaft 11) and drum 29 (display) to get back to their right positions. This process will take some time to be completed.

During this time the driver will be unable to accurately visualize the slope/grade of the road on the display of the slope indicator. This can even be worse when several +/− accelerations accrue in a row and in resonance with the previous ones. But, VTGI is designed in such way that it would take this into account and virtually eliminate it. The next paragraph will explain how this is done.

The flat one-piece balance spring 33 contains two parts. The bottom part is curved and shaped approximately like a half-circle. The bottom of this curved part of spring 33 is fixed to the top of the bottom of frames 16 and 17. The second part of spring 33 is a flat straight top part which is connected at both its ends to the ends of the curved part. The curved part also carries a pair of brake shoes 34 fixed to the outside ends of it. There is a small gap between the brake shoes and the internal cylindrical surface of indicating drum cylinder 29 (similar to the brake pads in a vehicle being separated by a small gap from the tire rims). A pair of weights 35 are fixed to the internal corners of spring 33 where its two parts (flat and curved part) join. This is so that each weight 35 is fixed to the opposite side of spring 33 from which a brake shoe is fixed. This makes a very efficient brake system for VTGI and will solve the problem explained in the previous paragraph.

At times of any kind of sharp or unsmooth +/− accelerations, the antistatic force from the mass of the two weights fixed on said spring causes the pair of brake weights 35 to move to either side and push brake shoes 34 forward or backward toward either sides of the internal surface of indicating drum cylinder 29. In this process, the rotations of indicating drum cylinder 29 will be prevented and therefore, there will not be any waste oscillations of indicating drum 29. At any moment, right after the release of sharp +/− accelerations, balance spring 33 takes brake shoes 34 to their normal balanced state and the indicating drum will be released to turn slightly to show the correct slope/grade of the road on the display right away (without having to waste a lot of time to adjust itself from the deviated oscillating waste movements).

The bottom curved part of flat spring 33 works as an action and balance spring for the brake system. The straight part of flat spring 33 has several specific functions:

1) It prevents weights 35 and brake shoes 34 from moving/escaping too far out from the inside surface of indicating drum 33, therefore preventing them from hitting the inside surface of the drum at the time of any fast gas/brake force back-kick action.
2) It helps keeping the precise distance/gap between brake shoes 34 and the internal surface of drum 33.
3) It helps pull back the opposite brake shoes from the opposite side and therefore prevent the brake shoes from sticking to one side and/or both sides of the internal surface of the drum at the same time.
4) It helps the weight of each brake shoe be summed with the other in combination therefore helping the manufacturers of VTGI use lighter weights for each individual brake shoe which in turn lead to a lighter weight for VTGI.

Please note that the internal VTGI brake system, described above, is unique for preventing the waste movements of the slope/grade display caused by +/− accelerations of the vehicle, therefore helps insuring the correct and quick displayed reading of the grade/slope of the course/terrain.

So far, it was explained above that brake shoes 34 prevent indicating drum 33 from oscillating at times of +/− accelerations of the vehicle while the driver is pressing hard on the gas or brake pedals. Also it was indicated that once the gas or brake pedal is released, then the gravity force acts on CCGA to bring it to its natural plummet position, which is under shaft 11. This action forces indicating drum 33, through four ratio gears 10, 22, 23, and 27, to roll to the correct slope/grade reading. It is understandable that when there aren't any +/− accelerations or when there is a very slight +/− acceleration of the vehicle, brake shoe 34 will not touch indicating drum 33 and CCGA will stay or move smoothly under shaft 11. In this situation, the drum roles slowly to the right slope/grade digit. But if there is a significantly different change of slope of the road in the time period that the driver starts pushing hard and releasing the gas or brake pedal, in these moments/seconds of time period CCGA will be free to move to get to its natural position which is under main shaft 11 and concurrently forces drum 33 to role to the right digit reading on the display; the drum again will not stop still on the right point right away, but makes some small tiny oscillations before it stops. In this case again, it will take a period of time for drum 33 to completely stop (without further oscillations) on the right spot. This problem is also solved in VTGI by filling its sealed shell with a liquid such as oil. This liquid/oil should be chosen to be clear in color and in such viscosity that it would make an appropriate fair resistance for the waste oscillating movements of indicating drum 33 after the brake or gas pedal is released. In case of the need for more resistance to help the oil to slow down indicating drum 33 faster, manufacturers of VTGI can fix some appropriate-sized metal fins vertical to the inside surface of drum 33, where these fins do not interfere with the brake system. It is of course obvious that these fins must be placed in such way that the balance of the central gravity of indicating drum 33 remains in the center of the drum. Oil can also help lubricate the internal parts of VTGI and therefore help the instrument work smoother, function better, and have a longer life.

One should realize that there is a difference between the functions of VTGI's brake system and its oil. In other words, each has its own function in acting to prevent the oscillations of the drum. The brake system stops indicating drum 11 from going far beyond its correct slope/grade digit position (i.e. tens of degrees) whereas the oil prevents indicating drum 11 from doing small tiny waste oscillations (if any) and therefore lets it smoothly come to the exact digit of reading in almost no time and not go further beyond that digit.

Finally, there are several other important points about VTGI:

1) VTGI's special internal design will allow this instrument to be installed in any location and position (even upside down) in any vehicle as long as it is within the convenient sight of the operator of that vehicle. Of course this is with the understanding that the instructions for installation with regards to main shaft 11 (described in the prior section of this document) are followed.

2) VTGI can be used not only to measure the longitudinal slope/grade of the road/terrain but also the transverse slope (or the slope of any other direction). Of course this can be done only with a portable VTGI and only if one pays attention to all the technical details regarding the installation and position of use of VTGI.

3) VTGI can be made in such way that each and/or all of the parts that make CCGA can be made heavy enough so that gravity weight 20 is small or completely eliminated.

4) The use of oil in VTGI is not mandatory although desired in most vehicles to slow the motion of the indicating drum in even very small waste swing/oscillating motions. The use of oil in the shell can be eliminated in cases of needed low cost mass production when very sensitive readings are not needed (example: for low-priced toys and some bicycle riders and/or other equipment/vehicle operators that prefer economical prices over extremely exact measurements of the slope/grade of the road/train). In these situations, there is also no need for the shell to be sealed, which will help manufacturing the device even with a lower cost/price. In some cases, instead of using oil, the manufacturers can use tiny spring-type washers on both sides of the indicating drum, to make a resistance for it for tiny waste oscillations.

The invention claimed is:

1. A device to assist a driver/operator of nearly all types of vehicles in measuring and showing the grade/slope of any road/terrain that said vehicle is traveling on, where said device is either portable whereby it is installed in one of many possible positions inside said vehicle and/or fixed in said vehicle as part of initial manufacturing of said vehicle; said device comprising in cooperative relationship: a first see-through cylinder which is held in between two round caps/embodiments forming a sealed shell; a first gear connected to a main shaft with said shaft connected at its two ends to the centers of said two round caps/embodiments of said sealed shell and said caps/embodiments' outside relief cylinders with said relief cylinders also used to connect said device to said vehicle; two frames hung from said main shaft by one hole each; a gravity weight held between and on the bottom of said frames by a bolt and nut; an assembly containing a second and a third gear connected to a shaft which in turn is installed parallel to previously said main shaft between said frames through two holes; a forth gear and an indicating drum connected to a bush which together turn on previously said main shaft; a display on said indicating drum for displaying said slope/grade; a second see-through cylinder which slides on the said first see-through cylinder with a horizontal indicating line marked on it; a flat half-circle-shaped spring with curved bottom and straight top, with the bottom of its curved part connected to the top of the bottom part of previously said frames; a pair of brake shoes connected to the outside ends of the curved part of said balance spring, said pair of brake shoes separated from the internal cylindrical surface of the previously said indicating drum by a small gap; a pair of weighs connected to the internal corners of said balance spring where the flat and curved part of said spring join so as to be connected on the opposite side of said spring where the previous said pair of brake shoes were connected.

2. A device as in claim 1 wherein there is no need for any sensors, parts related to said vehicle, or source of power with the exception of power source in case of need for seeing its said display during the night in which case there is the option of making the digits of its said display from night-glaring material.

3. A device as in claim 1 wherein the said bolt and nut, and/or said gravity weight, and/or said frames will be able to be manufactured as either one piece or separately.

4. A device as in claim 1 wherein such device is made in different desired scales or readings for different fields of use, that is motorized or non-motorized vehicles or other equipments or even toys, by using the right proportion of number of teeth on said four gears.

5. A device as in claim 1 wherein the driver/operator of said vehicle has the ability to easily change and adjust the position of the slope/grade readings, and/or any digit on its said display, to said driver/operator's desired convenient sight.

6. A device as in claim 1 wherein the use of a clear liquid/clear oil with the right viscosity filled into its said sealed shell and/or fins as to provide a fair resistance for the loose oscillating movements of said indicating drum is desired but not mandatory whereby said liquid/oil/fins prevent said indicating drum from doing small tiny loose oscillations and wherein if said liquid/oil is eliminated, there is no need for said sealed shell to be sealed anymore.

7. A device as in claim 1 designed to be installed in any location and position in any vehicle and still function properly as long as the axis of its said main shaft is vertical to the imaginary plane made from the crossings of the lines of the longitudinal axis of the road and the plumb line where said vehicle is traveling.

8. A device as in claim 1 where the said gravity weight may be either small or completely eliminated depending on the weight of other components of said device.

9. A method to assist the driver/operator of any many types of vehicles to measure and visualize the grade/slope of any road/terrain that said vehicle is traveling on, comprising the steps of the transmittal of longitudinal movements of said vehicle as an angular rotation to the shell of a device connected in the said vehicle, said device's main shaft, and said device's first gear connected to said main shaft; transmittal of said angular rotation from said first gear as a small rotation to a second gear of said device, with said first gear having a larger number of teeth than said second gear; transmittal of said angular rotation from second gear to a third gear of said device which is connected to said second gear and has a larger number of teeth than said second gear with both said second and said third gear connected to a frame, with or without a gravity weight, which along with this two recently said gears works as a plumb-line for said device; transmittal of angular rotation of said third gear, to a forth gear of said device where the said forth gear has less number of teeth than said third gear; transfer of initially mentioned angular rotation by said forth gear as a larger angular rotation to an indicating drum of said device with the slope/grade shown on said indicating drum; reduction of loose movements coming from deceleration and/or acceleration of said vehicle and therefore more quick and accurate measurement and display of said slope/grade by use of a flat half-circled spring with a pair of brake shoes and weighs attached to said spring together forming an efficient brake system all within said device; further reduction of said loose movements and therefore a quicker and even more accurate measurement and display of said slope/grade by use of a clear liquid/oil with the right viscosity and/or fins all within said device.

10. A method used as part of making any device that measures the slope/grade of a road that any vehicle is driving on, said method significantly reducing, or even eliminating, loose movements coming from decelerations and/or accelerations and/or harsh movements from bad road bumps with said method therefore helping more quick and accurate measurements which would have been delayed or inaccurate due to said loose/harsh movements and with said method comprising of a flat half-circled spring with a pair of brake shoes and weighs attached to said spring together forming an efficient brake system; a clear liquid/oil with the right viscosity and/or fins in conjunction with said brake system.

11. A method used as part of making a device that measures the slope/grade of a road that a vehicle is driving on, whereby said method provides the capability of changing small amounts of angular movements of the plumb-line and road grade to tens of times bigger scale; said method comprising of: the transmittal of longitudinal movements of said vehicle as an angular rotation to the shell of a device connected to said vehicle, said device's main shaft, and said device's first gear; transmittal of said angular rotation from said first gear as a small rotation to a second gear of said device, with said first gear having a larger number of teeth than said second gear; transmittal of said angular rotation from second gear to a third gear of said device which is connected to said second gear and has a larger number of teeth than said second gear with both said second and said third gear connected to a frame, with or without a gravity weight, which along with this two recently said gears works as a plumb-line for said device; transmittal of angular rotation of said third gear to a forth gear of said device where the said forth gear has less number of teeth than said third gear; transfer of initially mentioned angular rotation by said forth gear as a larger angular rotation to an indicating drum of said device with the slope/grade shown on said indicating drum.

12. A method as part of the method in claim number 1 for measuring the slope/grade of a road that any vehicle is driving on wherein the assembly of said gears may include more than four gears.

* * * * *